UNITED STATES PATENT OFFICE.

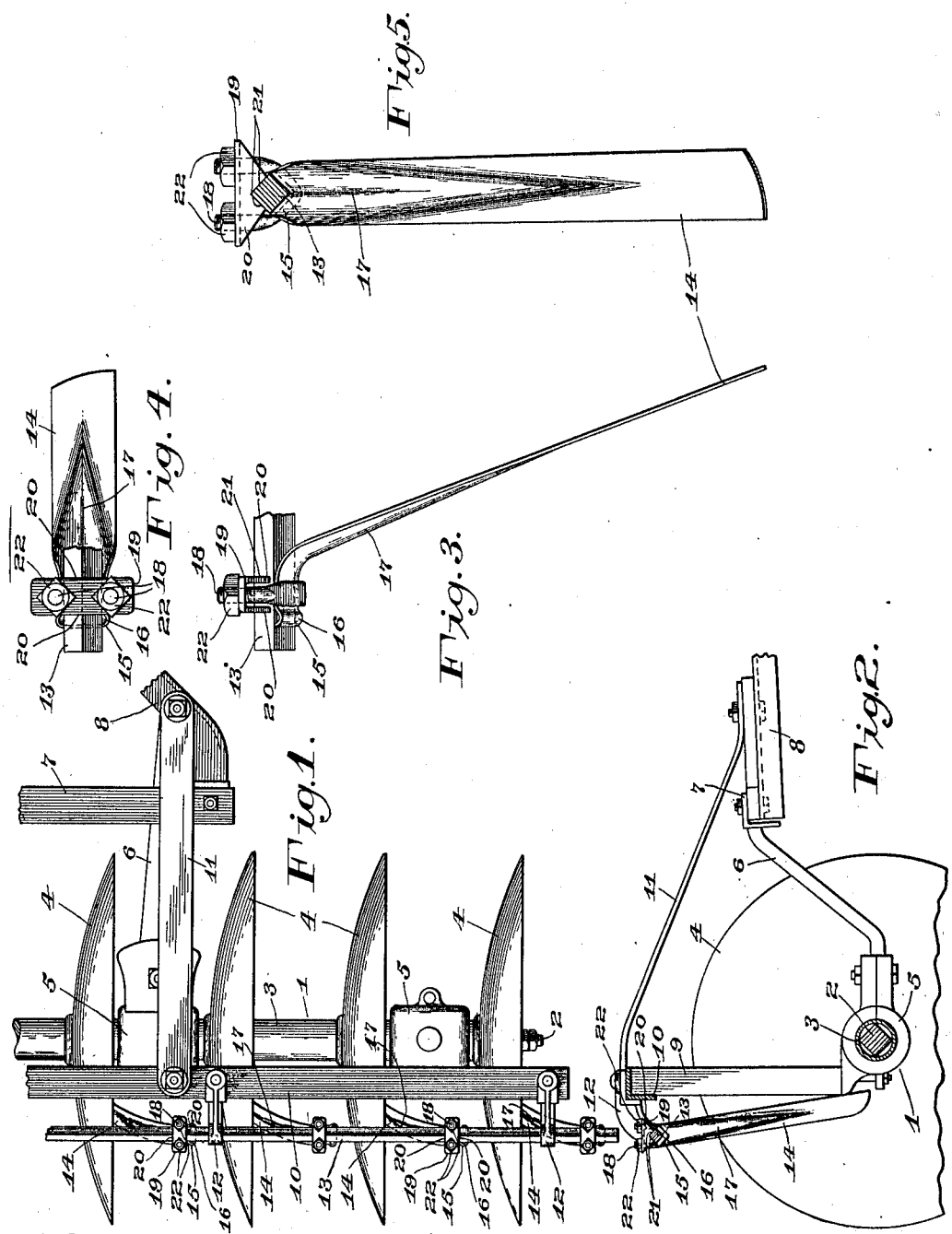

GEORGE W. WILLIS, OF AUBURN, NEW YORK, ASSIGNOR TO INTERNATIONAL HARVESTER COMPANY, A CORPORATION OF NEW JERSEY.

DISK HARROW.

1,021,174.  Specification of Letters Patent.  Patented Mar. 26, 1912.

Application filed November 4, 1911. Serial No. 658,469.

*To all whom it may concern:*

Be it known that I, GEORGE W. WILLIS, a citizen of the United States, residing at Auburn, in the county of Cayuga and State of New York, have invented certain new and useful Improvements in Disk Harrows, of which the following is a specification.

My invention relates to disk harrows, and in particular to an improved form of scrapers for the disks and means for securing them to the actuating rock shaft; the object of my invention being to provide a scraper formed from a single piece of steel, eliminating all cast parts and providing an improved saddle member coöperating with a special form of bolt in a manner to rigidly secure the scrapers to the rock shaft. These objects are attained by means of the mechanism illustrated by the accompanying drawings, in which—

Figure 1 represents a top plan view of part of a disk harrow having my improved scraper mechanism forming a part thereof; Fig. 2 is an end elevation of Fig. 1, partly in section, and having the lower part of the disks cut away; Fig. 3 is a side elevation on an enlarged scale, showing a part of the rock shaft with a scraper secured thereto; Fig. 4 is a top plan view of Fig. 3; and Fig. 5 is an end elevation of the rock shaft, as shown in Fig. 3, and a side view of the scraper blade secured thereto.

The same reference numerals designate like parts throughout the several views.

1 represents part of a disk gang, including an axle 2, spacing thimbles 3, disks 4, bearing box 5, having the axle journaled therein, and draft frame member 6, having its rear end secured to the bearing box and the front end thereof to the draft frame members 7 and 8 in a common way.

9 represents one of the vertical members of the gang frame, having its lower end secured to the bearing box and its upper end to a transverse bar 10, and 11 represents a brace member having its rear end pivotally connected with bar 10 and the front end thereof with the draft frame.

12 represents rearwardly extending brackets secured to bar 10, and 13 a rock shaft, preferably angular in cross section and journaled in the read ends of said brackets. The rock shaft is designed to be actuated by any of the usual means, as a foot or hand lever, not shown.

14 represents the scraper blade, having a laterally turned shank portion 15 at one end thereof formed to receive the angular shaft, the opposite end being made flat in order to fit closely against the surface of the adjacent disk, the shank portion of the blade being provided with a raised rib portion 16 at the outer end thereof, the body of the scraper blade having a longitudinally extending depressed portion 17 throughout a portion of the length thereof that is merged with and terminates in the angular shank portion, and gradually reduced in width and depth as it is, approaches the opposite end of the blade. The blade is secured to the rock shaft by means of a U-bolt 18, the head of the bolt being formed in a manner to fit closely against the angular shank. A saddle member 19, having side walls 20, provided with notched portions 21, is placed upon the corner of the shaft opposite the shank of the scraper, and a bolt passes through openings in the top wall of the saddle upon opposite sides of the shaft, and the parts are secured in place by means of nuts 22. The rib portion 16 upon the shank prevents any endwise movement thereof relative to the bolt.

What I claim as my invention, and desire to secure by Letters Patent, is:

1. A scraper mechanism for disk harrows including, in combination, a rock shaft angular in cross section, a scraper blade made from a single piece of sheet metal having a flat lower end and a longitudinally arranged depression in the body portion thereof terminating in a laterally turned shank portion at the upper end thereof that is adapted to receive said angular rock shaft, a transversely arranged rib portion at the outer end of said shank raised above the body portion thereof, and means for securing said shank to said rock shaft.

2. A scraper mechanism for disk harrows including, in combination, a rock shaft angular in cross section, a scraper blade made from a single piece of sheet metal having a flat lower end and a longitudinally arranged depression in the body portion thereof terminating in a laterally turned shank portion at the upper end thereof that is adapted to receive said angular rock shaft, a transversely arranged rib portion at the outer end of said shank raised above the body portion thereof, and a U-bolt having its head portion adjacent said rib and operative to secure said shank to said rock shaft.

3. A scraper mechanism for disk harrows including, in combination, a rock shaft angular in cross section, a scraper blade made from a single piece of sheet metal having a flat portion at one end and a laterally turned shank portion at the opposite end thereof, and a longitudinally arranged depression in the body portion thereof terminating in an angular depression in said shank and adapted to receive one angle of said rock shaft, a transversely arranged rib portion at the outer end of said shank raised above the body portion thereof, a saddle member having angular notches adapted to receive the opposite angle of said rock shaft, and a U-bolt having its head portion adjacent said rib and coöperating with said saddle member in a manner to automatically secure said scraper to said rock shaft.

GEORGE W. WILLIS.

Witnesses:
K. T. ELLIOTT,
H. S. WYLLIE.

Copies of this patent may be obtained for five cents each, by addressing the "Commissioner of Patents, Washington, D. C."